United States Patent [19]

Kojimoto et al.

[11] 4,191,518
[45] Mar. 4, 1980

[54] EQUIPMENT FOR PRODUCING SPECIAL PIPES

[75] Inventors: Susumu Kojimoto, Takatsuki; Takami Sato, Toyonaka; Toshio Mori, Takatsuki, all of Japan

[73] Assignee: Sumitomo Chemical Company, Limited, Osaka, Japan

[21] Appl. No.: 903,799

[22] Filed: May 8, 1978

Related U.S. Application Data

[62] Division of Ser. No. 723,977, Sep. 16, 1976, Pat. No. 4,113,814.

[30] Foreign Application Priority Data

Sep. 22, 1975 [JP] Japan .................................. 50/114969
Sep. 22, 1975 [JP] Japan .................................. 50/114970

[51] Int. Cl.² .............................................. B29D 23/04
[52] U.S. Cl. ................................. 425/326.1; 425/467
[58] Field of Search ................... 156/244, 500, 501; 264/89, 99, 177 R, 210 R, 296; 425/465, 326.1, 380, 467, 72 R, 325, 131.1, 462, 463, 133.1

[56] References Cited

U.S. PATENT DOCUMENTS

| 3,708,253 | 1/1973 | Lemelson ................ 425/326.1 X |
| 3,929,951 | 12/1975 | Shibata et al. ............ 264/177 R X |
| 3,994,646 | 11/1976 | Hauck ..................... 425/326.1 X |

*Primary Examiner*—Mark Rosenbaum
*Attorney, Agent, or Firm*—Stevens, Davis, Miller & Mosher

[57] ABSTRACT

Equipment for producing a pipe having a longitudinally extending diaphragm which partitions the interior of the pipe into two conduits. This equipment comprsises a die head with a circular slit to extrude the tubular body of the pipe and a flat slit to extrude the partitioning diaphragm. Means are provided to deform that diaphragm at spaced apart intervals along its length so as to intimately contact one of the pipe walls at those intervals. This means may be a nozzle having an opening for expelling a fluid against the diaphragm while it is still in a plastic state or a movable plate similarly positioned.

3 Claims, 5 Drawing Figures

EQUIPMENT FOR PRODUCING SPECIAL PIPES

This is a Division of application Ser. No. 723,977 filed Sept. 16, 1976 and now U.S. Pat. No. 4,113,814 of Sept. 12, 1978.

RELATED PRIOR ART

U.S. Pat. No. 3,866,833 issued Feb. 18, 1975 and the prior art cited therein.

The present invention relates to equipment for producing special pipes which have two conduits partitioned by diaphragm, one conduit being intercepted, at proper spaces, by portions of the diaphragm.

Hitherto, irrigation hoses has been used which comprise two conduits partitioned by diaphragm, the diaphragm and the wall of one conduit having small bores made therein. Further, in order to improve the uniformity of water-sprinkling or sloping ground, it is well known to intercept the perforated conduit at spaced intervals along the length.

Various irrigation hose having such intercepted conduit; are well known. One is an irrigation hose made of thin thermoplastic resin film having two conduits, one of which is intercepted by applying pressure or heat to said conduit from the outside of the hose. Another is an irrigation hose made of cloth or rubber sheet having two conduits, one of the conduits being intercepted by seaming.

Those types of irrigation hoses have poor pressure resistance and tear resistance and thus a short use life. When thick thermoplastic resin pipes suitable for irrigation hoses are used, it is very difficult to intercept a conduit at the proper interval. Even if the conduit can be intercepted, like the hoses made of thin thermoplastic resin film, by applying heat or pressure from the outside or by seaming, hollows are formed on the wall which detract from its appearance. Further, the hose can be easily broken, troublesome to handle and low in strength. There is no known method for the production of thick thermoplastic resin pipes having two conduits, one of which is intercepted at spaced intervals but with no accompanying disadvantage in appearance, handling and strength.

In general, when two kinds of liquid are transported in a pipe, valves are attached to two pipes and operated to supply the liquids, to stop the supply or to control the rates of flow. In this case, however, various troubles occur; for example sometimes the supply of liquid is interrupted due to valve troubles or leakage occurring at the valves or at components to which the valves are attached. Consequently, it is desirable to send two liquids using a pipe which is divided into two conduits and has a valve mechanism to control the flow. However, pipes satisfying such requirements are not known in the art.

The inventors have found that these problems can be solved by using a thermoplastic resin pipe which comprises two conduits partitioned by a diaphragm, one conduit being intercepted by projections on the diaphragm which extend into said one conduit.

An object of the present invention is to provide equipment to produce special pipes comprising two conduits one of which is intercepted at spaced intervals. Other objects and advantages of the present invention will be apparent from the following description.

According to the present invention, a special pipe comprising thermoplastic synthetic resin pipe having two conduits longitudinally partitioned by a diaphragm and having barriers to one conduit which are produced by projecting said diaphragm, at the spots spaced properly and longitudinally, into one conduit to contact intimately with the inside wall of the conduit.

The special pipes made by the equipment of the present invention are produced by deforming the diaphragm to contact intimately with or alternatively to melt-stick to the inside wall of the pipe. Consequently, there are no hollows on the outside wall and the pipes have a good appearance. Further, they are not easily broken, are easy to handle, are not easily damaged and bending causes no reduction in strength. Therefore, the special pipes made by the equipment of the present invention are a distinct improvement in the art.

The special pipes made by the equipment of the present invention can be equipped with a valve mechanism. For example, such a valve mechanism is obtained when a diaphragm made of flexible synthetic resin is deformed and projected into one conduit so as to be not fixed, but in separable intimate contact with the inside wall of said conduit, and a liquid is supplied to both conduits under different pressures.

The special pipes made by the equipment of the present invention can be produced so as to exhibit the following function: When the diaphragm projects, at spots spaced properly along the length, into a low-pressure conduit (referred to as "conduit A" hereinafter) to come close to or to contact intimately with the inside wall of conduit A, the projected portions of the diaphragm form barriers and intercept conduit A. While, when the pressure is higher in conduit A than in the other conduit (referred to as "conduit B" hereinafter), the portions projecting into conduit A turn over and project into conduit B whereby the barriers to conduit A are eliminated. Further, when the portions projecting into conduit B come close to or contact intimately with the inside wall of said conduit, the portions intercept conduit B.

In this way, the special pipe made by the equipment of the present invention can be equipped with a valve mechanism therein. As this pipe comprises two conduits, two kinds of liquid can be sent with one pipe. Further as the valve mechanism is of simple structure, it is not necessary to use two pipes equipped with valves of complicated structure as in the prior art. Therefore, the supply of liquid is not interrupted due to valve troubles or leakage of liquid occurring at the valves or at components to which the valves are attached. Further, the present special pipes have the advantage that piping cost is low.

The present invention will be illustrated specifically with reference to the drawings, which are only given for the purpose of illustration and not to be interpreted to limit the invention.

Figure 1:
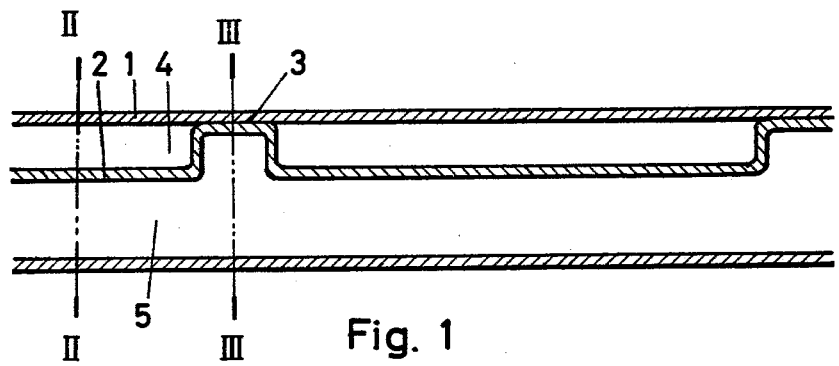
FIG. 1 is a longitudinally-sectional view of a pipe made by an embodiment of the present invention.
Figure 2:
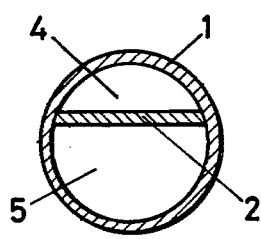
FIG. 2 is a cross-sectional view taken on a line II—II in FIG. 1.
Figure 3:
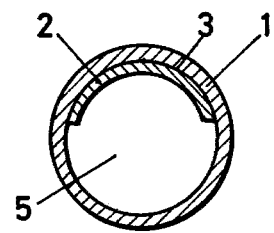
FIG. 3 is a cross-sectional view taken on a line III—III in FIG. 1.

In FIGS. 1, 2 and 3 reference numeral 1 is a pipe wall, numeral 2 is a diaphragm partitioning the pipe into two conduits, 3 is a barrier formed by deforming the diaphragm so as to intercept one conduit, and 4 and 5 are each a conduit formed by partitioning the pipe by the diaphragm 2. In FIG. 1, the barrier 3 may melt-stick to or, alternatively, come into a separable intimate contact with the pipe wall 1 of the conduit 4. In the latter case, if the pressure is higher in the conduit 5 than in the conduit 4, the barrier 3 remains in the position shown in FIG. 1. When pressure levels are reversed, the barrier 3 leaves the pipe wall 1 of the conduit 4 and, as it does not stick to said pipe wall, turns over and projects into the conduit 5. Thus, the barrier in the conduit 4 is eliminated.

Production of the special pipes of FIGS. 1–3 will be illustrated with reference to FIGS. 4 and 5.

Figure 4:
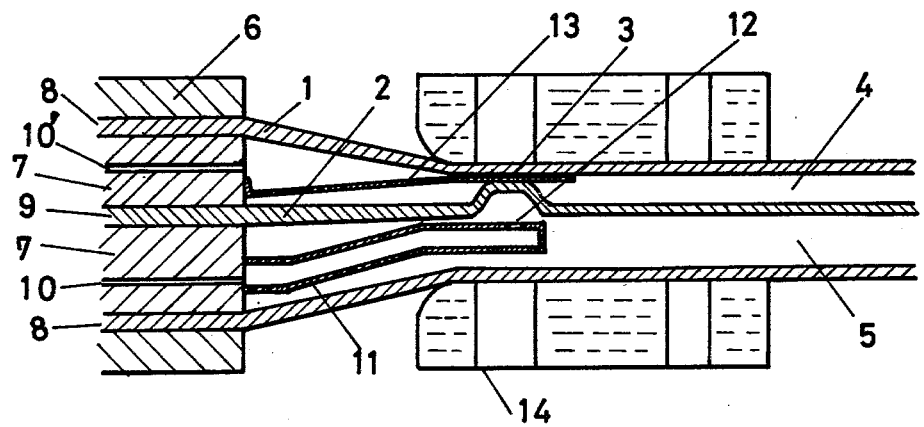
FIGS. 4 and 5 are schematic sectional side views of the equipment of the present invention.
Figure 5:
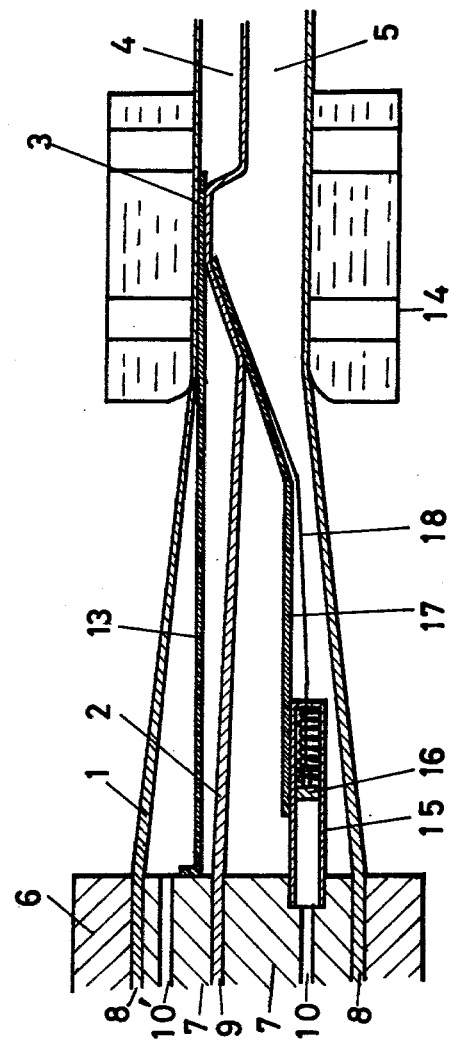

In FIG. 4, molten resin extruded from an extruder (not shown) forms a pipe in the following manner: Resin is extruded through a circular slit 8 between a die body 6 of the pipe-extruder and a mandrel 7, and through a slit 9 (for forming the diaphragm) in the mandrel 7. Thus, a pipe having diaphragm therein is produced. In this method, the pipe and diaphragm may be integrally extruded or may be separately extruded followed by melt-sticking. The pipe is sized and cooled in a vacuum sizing apparatus 14, and completely cooled in a water vessel (not shown) to solidify it. The pipe further passes through a take-off machine to take-up machine (not shown) wherein the pipe is wound in a definite length.

The barrier 3 is produced by projecting the plasticized diaphragm freshly extruded through the slit 9 into one conduit to contact intimately with or alternatively to melt-stick (to be fixed) to the inside wall of said conduit. For example, as is shown in FIG. 4, compressed air rushed out, through a slit 12 made in an air nozzle 11, against the freshly extruded diaphragm whereby the diaphragm is deformed and projected in the direction of the air stream to form a barrier. The compressed air is supplied through a hole 10 made in the mandrel 7 and the air nozzle 11, and the nozzle is attached to the nose of the mandrel 7 and inserted in the extruded pipe.

The length of the barrier in the axial direction is controlled by the time during which compressed air is permitted to escape and the rate at which the pipe is taken-off. The distance between the barriers is controlled by the time at which compressed air begins and the rate at which the pipe is taken-off. Further, the thickness of the barrier wall depends upon the pressure of compressed air. However, it is easily controlled by changing the thickness of diaphragm, in other words the width of slit 9. Deformation of the diaphragm may be carried out by expelling warm liquid such as warm water in place of compressed air.

For the material of the nozzle, pipes made of a heat-resisting material (e.g. metal, ceramic, resin) may well be used and the position of the slit or hole may properly be determined depending upon the position at which deformation of the diaphragm is desired. The length of the nozzle may properly be determined depending upon the said position relative to the mandrel.

Alternatively, the barrier 3 is produced likewise by the following method: The plasticized diaphragm freshly extruded from the slit 9 is projected into one conduit by pushing the movable nose of an apparatus against the diaphragm. The apparatus is attached to the nose of the die in the other conduit and is used to deform the diaphragm by mechanical operation. A specific embodiment is shown in FIG. 5. Compressed air is supplied, through the hole 10 made in the mandrel 7, to an air cylinder 15 attached to the nose of the mandrel 7. A piston 16 is driven by the action of compressed air whereby a movable plate 17 is moved toward the diaphragm via a wire 18. The movable plate 17 projects the diaphragm into the conduit opposite to the one in which the movable plate is inserted. In this way, the barrier 3 is formed. When the supply of compressed air to the air cylinder 15 is stopped, the movable plate returns to the original position. The length of the barrier 3 in the axial direction is controlled by the time during which compressed air is supplied and the rate at which the pipe is taken-off. The distance between the barriers is controlled by the time at which supply of compressed air begins and the rate at which the pipe is taken-off. As to the movable plate, an elastic and heat-resisting thin plate made of, for example, metal or resin, is desirable and the surface of the plate is preferably slippery. For example, the movable plate may be a thin metal plate having a coating film of lubricating resin such as Teflon (Registered Trademark) on the surface. The nose of the movable plate has the shape of a circular or elliptical arc so as to fit the inside surface of the conduit via the diaphragm when pushed up to deform the diaphragm. The movable plate is illustrated in FIG. 5 being driven by an air cylinder, however it may be driven by other common mechanisms for example an oil cylinder, electromagnet, pinion, rack and cam. The length of the movable plate may properly be determined depending upon the position, at which diaphragm is deformed, relative to the mandrel. Further, as the mechanically operable device for deformation of the diaphragm, one may be used having a flexible hollow body, in place of the movable plate at the nose thereof, the body being expandable vertically to the axial direction of the pipe.

The effect of the present invention may sufficiently be exhibited, when the deformed diaphragm melt-sticks to or alternatively comes into a separable but intimate contact with the inside wall of the pipe. However, in order to prevent the deformed diaphragm from melt-sticking (being fixed) to the inside wall, the following methods may be preferable. A non-tacky thin plate 13 is attached to the nose of the mandrel in the conduit diametrically opposed to the one wherein an air nozzle or diaphragm-deforming device is set up. The nose of the thin plate is located a little upstream (closer to the take-off machine) of the position at which the diaphragm is deformed, and the deformed diaphragm is taken-off while slipping over the thin plate. The non-tacky thin plate may optionally be selected from Teflon tape, Teflon-coated metallic foil and the like. Further, melt-sticking may be prevented likewise by spraying a liquid (e.g. water-soluble high-boiling liquids such as ethylene glycol and glycerin, silicon oil) in said conduit.

The diaphragm of the present special pipe may be located at the position of the diameter of the pipe or may be slightly spaced therefrom. Further, the length of the barrier may also optionally be varied. For the material for the present special pipes, any thermoplastic synthetic resin used for the preparation of usual pipes may be used. However, polyolefin resins such as low density polyethylene, high density polyethylene, polypropylene and polybutene-1 are particularly preferred. When the special pipes are equipped with a valve mechanism, flexible thermoplastic synthetic resins such as plasticized polyvinyl chloride, ethylene-vinyl acetate copolymer and thermoplastic rubber are desirable. The thickness of the barrier having valve mechanism may be easily selected in consideration of the pressure difference between two conduits in use and the flexibility of the resin of the barrier, etc., is preferably from 0.1 to 2 mm. Even if the thermoplastic synthetic resins used in the present invention contain additives, fillers or colorants which are well known to the skilled in the art, the effect of the present invention is still present.

The special pipes of the present invention are useful as irrigation hose for agriculture and forestry. When the special pipes are used as irrigation hose, holes are made, at proper spaces, in the pipe wall of the intercepted conduit and the diaphragm with water being supplied to the non-intercepted conduit. Water is then sprinkled through the holes in the pipe wall. The irrigation hose made of the special pipe (including the special pipe having melt-stick barriers and barriers having valve mechanism) has a good uniformity of water-sprinkling even when used on sloping ground. Further, when the special pipes are used for sending pond water or sea water, the pipes are easily floatable because air may be contained in the spaces between the barriers. Consequently, there is advantageously no need to float the pipes with floatation bladders as is common in the prior art. Moreover, among the present special pipes, those produced so that both conduits can be intercepted alternately are useful for sending two kinds of liquid alternately.

What is claimed is:

1. Equipment for producing a special pipe, said pipe having a thermoplastic resin tubular body longitudinally partitioned by a diaphragm into two conduits and a plurality of barriers to one of the conduits forming projections extending from said diaphragm into said one conduit and spaced along the length of the conduit to contact intimately with the inside wall of the conduit, said equipment comprising a die body having:
   (a) a circular slit therein for extrusion of said tubular body;
   (b) a stationary mandrel having flat slit therein for extrusion of said diaphragm, and
   (c) a nozzle projecting downstream from the mandrel so as to extend longitudinally into one conduit of a tubular body extruded from said circular slit and partitioned by a longitudinally extending diaphragm, said nozzle having an opening for expelling a fluid against the diaphragm and deforming it into the other conduit thereby to form barriers.

2. Equipment for producing a special pipe, said pipe having a thermoplastic resin tubular body longitudinally partitioned by a diaphragm into two conduits and a plurality of barriers to one of the conduits forming projections extending from said diaphragm into said one conduit and spaced along the length of the conduit to contact intimately with the inside wall of the conduit, said equipment comprising a die body having:
   (a) a circular slit therein for extrusion of said tubular body;
   (b) a stationary mandrel having flat slit therein for extrusion of said diaphragm; and
   (c) an apparatus projecting downstream from said mandrel so as to extend longitudinally into one conduit of a tubular body extruded from said circular slit and partitioned by a longitudinally extending diaphragm, said apparatus having a longitudinally elongated movable plate shaped and positioned to deform the extruded diaphragm into the other conduit by pushing against the diaphragm thereby to form barriers.

3. Equipment according to claim 2 wherein said apparatus comprises a plate and an air cylinder for operating the plate.

* * * * *